Aug. 23, 1938.   J. CANETTA   2,128,038
VARIABLE LOAD BRAKE
Filed Aug. 7, 1936
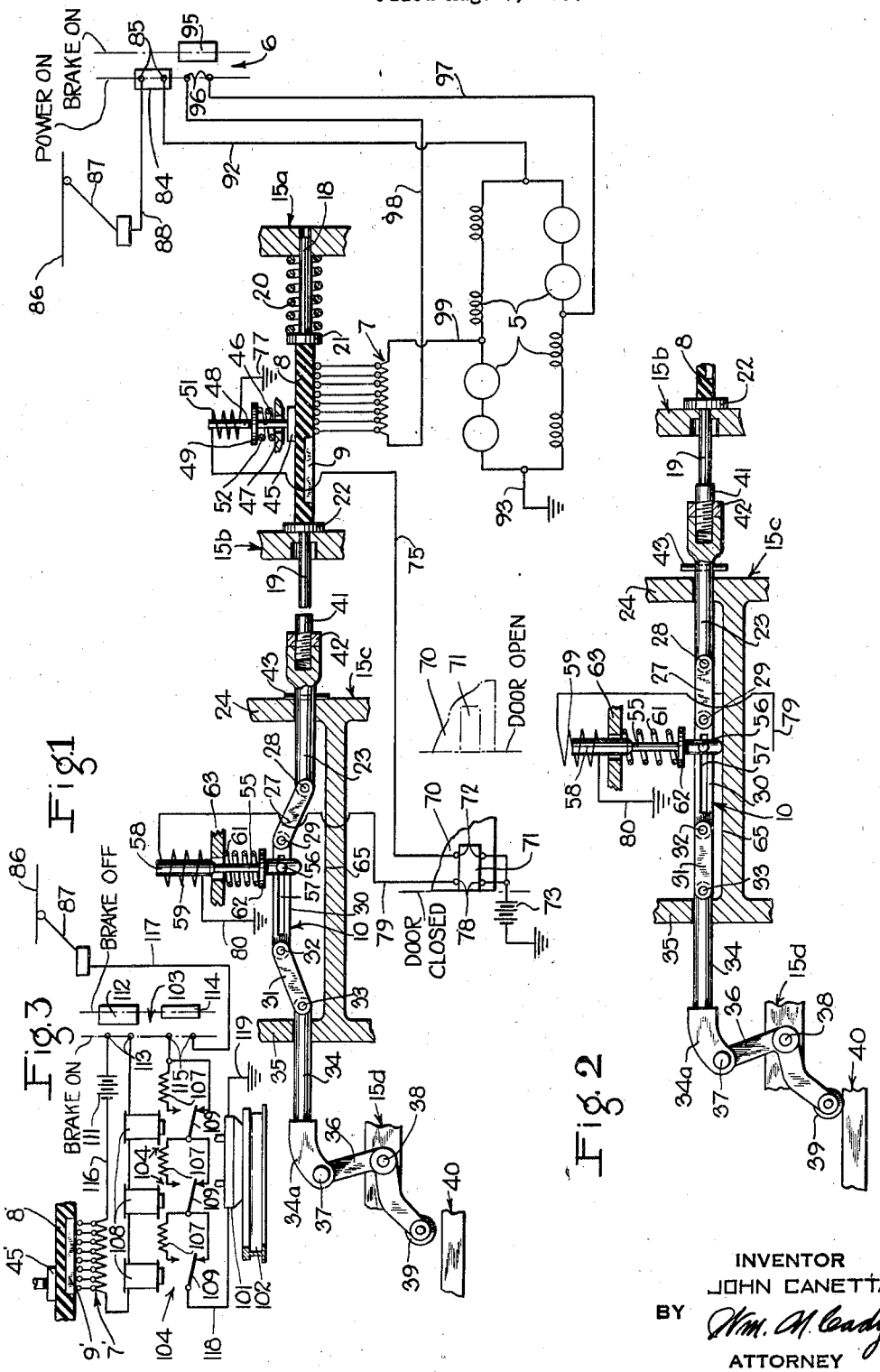
INVENTOR
JOHN CANETTA
BY  Wm. M. Cady
ATTORNEY Patented Aug. 23, 1938

2,128,038

UNITED STATES PATENT OFFICE 2,128,038

VARIABLE LOAD BRAKE

John Canetta, Wilkinsburg, Pa., assignor to The Westinghouse Air Brake Company, Wilmerding, Pa., a corporation of Pennsylvania Application August 7, 1936, Serial No. 94,757

18 Claims. (Cl. 188—195)

This invention relates to vehicle brakes, and more particularly to a variable load control apparatus for electric brakes.

One object of my invention is to provide improved means automatically operative in accordance with the load on the vehicle to vary the braking power of an electric brake such as a magnetic track brake or dynamic brake.

Another object of my invention is the provision of variable load brake means automatically operative while the doors of the vehicle are open to adjust the brake controlling means of an electric brake system according to the loading of the vehicle, and electrical means for holding the brake controlling means in the adjusted position when the doors are closed preparatory to operation of the vehicle.

A further object of the invention is to provide means for rendering load controlling means for an electric brake inoperative when the doors of the vehicle are closed, so as to prevent undesired wearing of the parts or damage thereto caused by swaying or jolting of the vehicle during operation thereof.

Other objects and advantages of the invention will be apparent in the following description thereof, taken with reference to the accompanying drawing, wherein:

Fig. 1 is a diagrammatic view, partly in section, of an electric brake system embodying one form of my invention; Fig. 2 is a diagrammatic view of a portion of the load brake apparatus shown in Fig. 1, showing the operative position thereof; and Fig. 3 is a diagrammatic view of a magnetic track brake system embodying a modified form of my invention.

As shown in Fig. 1 of the drawing, there is provided a dynamic brake system comprising driving motors 5, which are controlled by a motorman's controller 6. For the purpose of illustration the controller 6 is shown as having a brake on position, in which the motors 5 are adapted to be operated as electric generators for producing the well known dynamic braking effect, and a power on position in which the motors are adapted to be supplied with current for driving the vehicle, it being understood that the controller 6 may in actual practice be provided with a plurality of power on positions for controlling the motor circuit.

Variable load means is provided for automatically varying the resistance in the dynamic braking circuit for controlling the braking power in accordance with the load on the vehicle while it is at a standstill, which means is preferably carried by the underframing of the vehicle body and includes a rheostat 7, a retractile linkage mechanism 10 for operating the rheostat and means for transmitting relative movement between the frame and the truck to the linkage mechanism.

A horizontally disposed shiftable rod 8 is provided for cutting resistors of the rheostat 7 into and out of the dynamic braking circuit, a suitably insulated shunt contact 9 being carried on the rod for engaging the contacts of the rheostat. One end 18 of the rod 8 is slidably mounted in a bore in a frame portion 15a of the vehicle body and the other end thereof extends through a suitable bore in a frame portion 15b. A spring 20 is interposed between the frame portion 15a and a shoulder 21 of the rod 8 for urging the rod toward a car-empty position in which the shunt contact 9 is out of engagement with the contacts of the rheostat 7 so that all resistors thereof are effective in the dynamic braking circuit. Movement of the rod 8 by the spring 20 is limited by a stop collar 22 which is secured to the rod adjacent the end 19 and is adapted to engage the frame portion 15b.

For holding the rod 8 in an adjusted position against the pressure of the spring 20 there is provided a block 45 adapted for frictional engagement with a friction face provided on the rod 8. The block 45 is carried by a stem 46, and a spring 52 is interposed between a frame portion 47 and a collar 49 provided on the stem for normally urging the block out of engagement with the rod 8.

For moving the block 45 into frictional engagement with the rod 8, a solenoid coil 51 is provided, having a core member 48 adapted to be moved when the coil 51 is supplied with current. The core member acts on the collar 49, so that movement of said member causes the stem 46 to press the block 45 into engagement with the rod 8. A spring 52 is interposed between the frame portion 47 and the collar 49 for urging the friction block 45 upwardly and away from the rod 8.

The retractile linkage mechanism 10 is designed for the purpose of preventing the shifting of the rod 8, when the car door is closed, by a movement of the frame relative to the truck. This mechanism comprises a reach rod 23 which is slidably mounted in a flange 24 of a frame portion 15c in alignment with the end 19 of the rod 8, a link 27 having one end pivotally connected to the end of the reach rod by means of a pin 28 and the other end pivotally connected by means of a pin 29 to one end of a lifting element 30, and a similar link 31 pivotally connected by means of a pin 32 to the other end of the lifting element and by means of a pin 33 to a rod 34, which in turn is slidably mounted in a suitable bore in a flange 35 of the frame portion 15c. The outer end of the rod 34 carries a clevis 34a which is pivotally connected to one arm of a bell crank lever 36 by a pin 37, said bell crank lever being journaled on a pin 38 carried by a frame portion 15d. A roller 39 is provided on the other arm of the bell crank lever, which roller is adapted operatively to engage a portion 40 of the vehicle truck when the linkage mechanism is in operative position.

An adjustable stud 41 has screw-threaded engagement in the free end of the reach rod 23 and is adapted to engage the end 19 of the rheostat rod 8, a lock nut 42 being provided for holding the stud in the desired adjusted position. A stop pin 43 is transversely fitted through the reach rod 23 and is adapted to engage the flange 24 to limit travel of the reach rod away from the end 19 of the rheostat rod.

When the several elements 23, 27, 30, 31 and 34 of the linkage mechanism 10 are aligned in the operative position, as shown in Fig. 2, the roller 39 will be in operative engagement with the truck portion 40 while the lug 41 will be in engagement with the end 19 of the rod 8, as shown in Fig. 2. It will further be noted that if the lifting element 30 of the retractile linkage mechanism 10 is raised upwardly, the reach rod 23 will be shifted to the left through the medium of the link 27 to disengage the lug 41 from the end 19 of the rheostat rod, while with the pin 43 of the rod 23 in engagement with the flange 24 the rod 34 will be shifted to the right through the medium of the link 31 so as to turn the bell crank lever 36 in a clockwise direction and thereby lift the roller 39 out of engagement with the truck portion 40 as shown in Fig. 1 of the drawing, the mechanism being so designed and proportioned that the roller will remain out of engagement with the truck portion 40 throughout the maximum range of relative movement between the frame and the truck.

Means for controlling the positioning of the linkage mechanism 10 is provided, comprising a vertically disposed member 55, which is operatively connected to the lifting element 30 by means of a pin 56 that is adapted to ride in a horizontal slot 57 formed in said element, and which member has a core portion 58 adapted to be pulled upwardly by a retracting solenoid 59 when the winding thereof is energized. A spring 61 is interposed between a collar 62 provided on the lower portion of member 55 and a frame portion 63 secured to the body of the vehicle, which spring is arranged to urge the member 55, pin 56 and lifting element 30 downwardly into the operative position shown in Fig. 2 of the drawing, it being understood that the power of said spring is sufficient, as aided by the weight of the elements mentioned, to overcome any tendency of the spring 20 to act through the medium of the shiftable rod 8 to cause undesired buckling of the linkage mechanism 10.

Any suitable means, such as the horizontal web 65 formed on the frame portion 15c and adapted to be engaged by the rounded lower end of the member 55, may be provided for limiting downward movement of the member so as to ensure proper operative alignment of the elements of the linkage mechanism 10.

In order to ensure that the rod 8 will be held in its adjusted position when the linkage mechanism 10 is not in the operative position thereof, the holding solenoid 51 is preferably arranged to be energized for operating the friction block 45 prior to energization of the retracting solenoid 59 for operating the linkage mechanism 10 to the retracted position, and for the same reason the retracting solenoid is preferably adapted to be deenergized before the holding solenoid is deenergized.

One means for providing this feature is illustrated in Fig. 1 of the drawing, in which the door 70 of the vehicle is provided with a switch contact 71 which is operable, as the door is moved to the left or toward closed position, first to bridge contacts 72 for closing a circuit from a source of power such as the battery 73, through the contacts 71 and 72, a conductor 75, the magnet 51 and grounded conductor 77, and then to bridge in addition contacts 78, thereby completing a circuit including the battery, the contacts 71 and 78, a conductor 79, the magnet 59 and grounded conductor 80. It will of course be evident that, when the door 70 is opened, the switch contact 71 is moved first to open the contacts 78 and then to open the contacts 72, so that the holding magnet 51 will remain energized for an interval after deenergization of the retracting magnet 59.

In operation, assuming that the door 70 is opened to permit loading or unloading of the vehicle, the switch contact 71 is thereby first moved out of engagement with contacts 78 to deenergize the retracting solenoid 59 and is then moved out of contact with the contacts 72 so as to deenergize the holding solenoid 51. The spring 52 is thus enabled to force the friction block 45 out of engagement with the shifting rod 8, while the member 55 is released to permit the spring 61 to move said member and the connected elements 30, 31 and 27 of the linkage mechanism 10 into the operative position as already described, the roller 39 on the bell crank lever 36 then being in engagement with the truck portion 40 while the lug 41 is in engagement with the end 19 of the rod 8, as shown in Fig. 2 of the drawing.

With the parts in this position, if the load on the vehicle is increased, the body of the vehicle is moved downwardly relative to the truck frame, compressing the truck springs. Movement of the frame portion 15d toward the truck portion 40 causes the bell crank lever 36 to be turned in a clockwise direction about the pin 38 so as to shift the rod 34, the linkage mechanism 10 and the shifting rod 8 toward the right, as viewed in the drawing, compressing the spring 20. As the load on the vehicle increases, the rod 8 is thus operated in accordance with the load to move the shunt contact 9 into contact with certain of the contacts of the resistor 7, thereby shunting out portions of the resistance in the dynamic braking circuit for proportionately increasing the available braking power of the dynamic brake.

If on the other hand the load on the vehicle is lightened, the consequent expansion of the truck springs (not shown) will cause the frame portion 15d to move upwardly relative to the truck portion 40, so as to permit the spring 20 to move the rod 8 and the aligned elements of the linkage mechanism 10 toward the left, rocking the bell crank lever 36 in a counterclockwise direction about the pin 38. It will be apparent that this operation of the rod 8 will then position the shunt contact 9 relative to the rheostat 7 to proportionately increase the resistance in the dynamic braking circuit according to the unloading of the vehicle for thereby decreasing the available braking power.

After the vehicle has been loaded or unloaded the door 70 is operated toward door-closed position, thereby moving the switch contact 71 first to bridge the contacts 72 for energizing the holding magnet 51, and then to bridge the contacts 78 for energizing the retracting magnet 59. The holding magnet 51 when energized moves the friction block 45 into engagement with the shifting rod 8 to prevent movement thereof, and the retracting magnet 59 when thereafter energized, pulls the member 55 upwardly and thus retracts the linkage mechanism 10 in the manner already described into the inoperative position shown in Fig. 1.

The vehicle may then be operated in the usual manner, the controller 6 being moved to a power-on position, in which a contact segment 84 bridges a pair of contacts 85 for completing the circuit for supplying current to the motors 5, the circuit being from an overhead conductor 86 through a trolley 87, a conductor 88, the contacts 85 and 84, conductor 92, the motors 5 and grounded conductor 93.

When it is desired to effect an application of the brakes, the controller 6 is operated first to move the contact segment 85 out of engagement with the contacts 85 and then to move a contact segment 95 to bridge contacts 96, thus completing the dynamic braking circuit from the motors 5, which are now operated as generators, through a conductor 97, the contacts 96 and 95, a conductor 98, the resistors in the rheostat 7, and the return conductor 99. It is evident that, since the amount of resistance in the dynamic braking circuit has already been fixed in proportion to the load on the vehicle by the positioning of the rod 8 and shunt contact 9 relative to the rheostat 7, as already described, the dynamic braking effect now produced will also be proportionate to the load on the vehicle.

Referring to Fig. 3 of the drawing, there is shown a modified form of my invention associated with a magnetic track brake system, which comprises a track shoe 101 adapted to engage the rail 102, a braking controller 103, a plurality of magnetic relays 104 which are arranged to be selectively energized for controlling the amount of resistance in the track shoe circuit, and the rheostat 7' which is arranged to control the current supplied to the relays 104 in proportion to the load on the vehicle.

The relays 104 are designed to operate independently in response to different degrees of energizing current supplied thereto in proportion to the load on the vehicle for varying the resistance in the track shoe circuit. Each of the relays may comprise a resistance unit 107, a magnet 108 and a movable contact 109, which contact is adapted normally to shunt the associated resistance unit out of the track shoe circuit and is operative on a predetermined degree of energization of the magnet for including the resistance unit in said circuit. The magnets 108 may be connected in series, as shown in Fig. 3 of the drawing, and are adapted to be supplied with current from a battery 111 or other suitable source of electrical energy.

In order that the relays 104 may operate selectively, the magnets 108 are so wound that with a certain light current intensity, only one of the magnets will be energized sufficiently to pick up its corresponding movable contact 109. With a greater current intensity two of the magnets will be so energized as to pick up their associated contacts, while all three of the magnets will respond to a maximum current intensity so as to pick up each of the respective contacts 109.

The rheostat 7' is provided for controlling the amount of current supplied by the battery 111 to the magnets 108, and is arranged to be controlled by the shunt contact 9' carried by the shifting rod 8', which is adapted to shunt out all sections of the resistor when the shifting rod is held in car empty position by the friction block 45', as shown in Fig. 3 of the drawing. The shifting rod 8' is otherwise similar to the shifting rod 8 in Fig. 1 and is adapted to be moved to the right in proportion to the load on the vehicle, in the manner already described, for including sections of the rheostat 7' in the magnet circuit.

The controller 103 may be of any suitable construction, and as shown in the drawing in diagrammatic form is provided with a contact 112 adapted to bridge contacts 113 for completing the relay circuit, and a contact 114 adapted to bridge contacts 115 for effecting the supply of current through the track shoe circuit, the contact 112 being preferably arranged slightly in advance of the contact 114 so that the relays 104 will be energized prior to energization of the track shoe 101. It is to be understood that any well known means (not shown) for manually varying the current supplied to the track shoe 101 may be associated with the controller 103 if desired.

To effect an application of the brakes, assuming that the rod 8' has been operated in the manner already described to move the shunt contact 9' relative to the contacts of the rheostat 7' so as to include an amount of resistance in the magnet circuit in proportion to the load on the vehicle, the braking controller 103 is moved toward the brake-on position. In the initial stage of this movement, the contact 112 is operated to bridge the contacts 113 so as to close the magnet circuit which includes the battery 111, said contacts, the magnets 108, the rheostat 7' and return conductor 116 thereby effecting operation of such of the relays as are operably energized by the current supplied. For example, if the car is lightly loaded and the rod 8' consequently positioned to cut into the magnet circuit only a small section of the rheostat 7', the current in that circuit may be such as to energize all of the magnets 108 sufficiently to pick up each of the respective contacts 109, thus connecting a maximum amount of resistance in the track shoe circuit. On the other hand, with the rod 8' positioned by a heavy load on the vehicle to include a larger amount of resistance in the magnet circuit, the flow of current therethrough, upon the initial movement of the controller 103 just described, may be sufficient to energize only the relay responsive to a light current, in which case only one of the resistances 107 would be included in the track shoe circuit. As the controller 103 is further moved toward brake-on position the contact 114 bridges the contacts 115, thereby completing the brake shoe circuit, which leads from overhead conductor 86 and trolley 87 through the conductor 117, contacts 114 and 115, the resistances 107, conductor 118, the track shoe 101 and grounded conductor 119.

It will thus be evident that the invention provides improved means of relatively simple and inexpensive construction for varying the degree of application of an electric brake in proportion to the load on the vehicle, including retracting means for preventing undesired movement of the variable load means when the vehicle is in motion.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a load brake system for a vehicle, in combination, electric braking means, variable resistance means for varying the resistance in the circuit of said braking means, load controlled means for adjusting said variable resistance means according to the load on the vehicle, a member arranged to be moved in conditioning the vehicle to proceed after a stop has been made, and electro-responsive means responsive to movement of said member for rendering said load controlled means inoperative.

2. In a load brake system for a vehicle, in combination, electric braking means, variable resistance means for varying the resistance in the circuit of said braking means, load controlled means for adjusting said variable resistance means according to the load on the vehicle, a member arranged to be moved in conditioning the vehicle to proceed after a stop has been made and means responsive to movement of said member for first fixing said variable resistance means against movement from its adjusted position and for then rendering said load controlled means inoperative.

3. In a vehicle brake system, in combination, electric brake means, controlling means for regulating the braking power of said brake means, load controlled means having an operating position in which said load controlled means is movable according to the load on the vehicle for adjusting said controlling means, said load controlled means being adapted to be retracted from said operating position to a position in which said load controlled means is not moved according to the load on the vehicle, and electro-responsive means operative upon the closing of a vehicle door to retract said load controlled means from said operative position.

4. In a vehicle brake system, in combination, electric brake means, controlling means for regulating the braking power of said brake means, load controlled means having an operating position in which said load controlled means is movable according to the load on the vehicle for adjusting said controlling means, said load controlled means being adapted to be retracted from said operating position to a position in which said load controlled means is not moved according to the load on the vehicle, electro-responsive holding means operable to hold said controlling means against movement from its adjusted position, electro-responsive retracting means for withdrawing said load controlled means from the operative position thereof, and means operative upon the closing of a vehicle door to first cause operation of said holding means to hold said load controlled means against movement and to then effect operation of said retracting means to move said load controlled means from said operative position.

5. In a vehicle brake system, in combination, electric brake means, controlling means for regulating the braking power of said brake means, load controlled means having an operating position in which said load controlled means is movable according to the load on the vehicle for adjusting said controlling means, said load controlled means being adapted to be retracted from said operating position to a position in which said load controlled means is not moved according to the load on the vehicle, electro-responsive means adapted to be energized to retract said load controlled means from said operative position, and means for holding said controlling means against movement from its adjusted position while said electro-responsive means is energized.

6. In a load brake system for a vehicle, in combination, electric braking means, variable resistance means for regulating the current in the circuit of said braking means, yielding means for biasing said variable resistance means toward a car-empty position in which the available braking power is at a minimum, load controlled means adapted to be normally in an operative position in which said load controlled means is movable according to the load on the vehicle for adjusting said variable resistance means, electro-responsive holding means operative to maintain said resistance means in an adjusted position, electro-responsive retracting means operative to move said load controlled means out of its operative position, a member arranged to be moved in conditioning the vehicle to proceed after a stop has been made, and means responsive to movement of said member first to operate said holding means and then to operate said retracting means.

7. In a load brake apparatus for a vehicle including a body and a truck, in combination, means for varying the braking power on the vehicle including a movable member, an element movable upon a movement of the vehicle body relative to the vehicle truck, a plurality of links operatively connecting said member with said element and adapted to transmit movement from said element to said member with the links in alignment, a mechanism adapted to be operated when the vehicle is conditioned to proceed, and electrically controlled means responsive to operation of said mechanism for moving said links out of alignment to prevent movement of said member upon movement of said body relative to said truck.

8. In a load brake apparatus for a vehicle including a body and a truck, in combination, means for varying the braking power on the vehicle including a movable member, an element movable upon a movement of the vehicle body relative to the vehicle truck, a plurality of links operatively connecting said member with said element and adapted to transmit movement from said element to said member with the links in alignment, a mechanism adapted to be operated when the vehicle is conditioned to proceed, electrically controlled means responsive to operation of said mechanism for holding said element in its adjusted position, and electrically controlled means responsive to said operating condition for moving said links out of alignment to prevent movement of said member upon movement of said body relative to said truck.

9. In a load brake apparatus for a vehicle comprising a truck and a body having a door, in combination, an electrically controlled brake, means for varying the resistance in the circuit of said brake including a movable member, an element movable upon a movement of the vehicle body relative to the vehicle truck according to variations in the load on the vehicle for moving said member, electro-responsive means operative to prevent movement of said member upon movement of said body relative to said truck, and electro-responsive means operative to hold said member against movement from its adjusted position, the opening and closing of the circuits of both said electro-responsive means being controlled by the movement of the vehicle door.

10. In a load brake apparatus for a vehicle, in combination, electric braking means, a plurality of resistors for the circuit of said braking means, a plurality of electro-magnetic switch devices operable selectively according to the current supplied thereto to connect said resistors in and to shunt said resistors out of said brake circuit, load controlled means for varying the current supplied to operate said switch devices in accordance with the load on the vehicle, and a manually operative braking controller operative to control the supply of current through said brake circuit.

11. In a load brake apparatus for a vehicle, in combination, electric braking means, a plurality of resistors for the circuit of said braking means, a plurality of electro-magnetic switch devices operable selectively according to the current supplied thereto to connect said resistors in and to shunt said resistors out of said brake circuit, load controlled means for varying the resistance in the magnet circuit for said electro-magnetic switch devices in proportion to the load on the vehicle, and a manually operative braking controller operative first to close said magnet circuit and then to close said braking circuit for effecting an application of the braking means.

12. In a vehicle brake system, in combination, electric braking means, controlling means for regulating the braking power of said braking means, biasing means for urging said controlling means in one direction, load controlled means operative according to the load on the vehicle to move said controlling means in opposition to said biasing means, a member arranged to be moved in conditioning the vehicle to proceed, and means responsive to a movement of said member for first preventing movement of said controlling means from its adjusted position and for then rendering said load controlled means ineffective.

13. In a vehicle brake system, in combination, electric brake means, controlling means for regulating the braking power of said braking means, load controlled means having an operating position in which said load controlled means is movable according to the load on the vehicle for adjusting said controlling means, said load controlled means being adapted to be retracted from said operating position to a position in which said load controlled means is not moved according to the load on the vehicle, electroresponsive means adapted to be energized to retract said load controlled means from said operative position, other electroresponsive means adapted to be energized for holding said controlling means against movement from its adjusted position, and common means controlling the energization of both said electroresponsive means.

14. In a vehicle brake system, in combination, electric brake means, controlling means for regulating the braking power of said brake means, load controlled means having an operating position in which said load controlled means is movable according to the load on the vehicle for adjusting said controlling means, said load controlled means being adapted to be retracted from said operating position to a position in which said load controlled means is not moved according to the load on the vehicle, electroresponsive means operable for positioning said load controlled means, other electroresponsive means operable for holding said controlling means against movement, and common means controlling the energization of both said electroresponsive means.

15. In a load brake system for vehicles, in combination, brake applying means, means for varying the braking power of said brake applying means, a plurality of electro-magnetic devices operable selectively according to the degree of energization thereof for controlling said varying means, and load controlled means for varying the degree of energization of said electro-magnetic devices in accordance with the load on the vehicle.

16. In a load brake system for vehicles, in combination, brake applying means, means for varying the braking power of said brake applying means, a plurality of electro-magnetic devices operable selectively according to the degree of energization thereof for controlling said varying means, load controlled means for varying the degree of energization of said electro-magnetic devices in accordance with the load on the vehicle, and a manually operable braking controller for conditioning said varying means to effect an application of the brakes.

17. In a vehicle brake system, in combination, brake applying means, means for varying the braking power of said brake applying means, a plurality of electro-magnetic devices operable selectively according to the degree of energization thereof for controlling said varying means, and means controlled according to a variable operating condition of the vehicle for correspondingly varying the degree of energization of said electro-magnetic devices.

18. In a load brake system for vehicles, in combination, braking means, electrically controlled means operable at one degree of energization for causing said braking means to apply the brakes with one degree of force, electrically controlled means operable at another degree of energization for causing said braking means to apply the brakes with another degree of force, and means for varying the degree of energization of said electrically controlled means according to the load on the vehicle.

JOHN CANETTA.